(12) United States Patent
Kaji et al.

(10) Patent No.: US 11,203,359 B2
(45) Date of Patent: Dec. 21, 2021

(54) VEHICLE CONTROL SYSTEM, VEHICLE CONTROL METHOD, AND STORAGE MEDIUM

(71) Applicant: HONDA MOTOR CO., LTD., Tokyo (JP)

(72) Inventors: Toshiyuki Kaji, Wako (JP); Yoshifumi Nakamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 350 days.

(21) Appl. No.: 16/226,778

(22) Filed: Dec. 20, 2018

(65) Prior Publication Data

US 2019/0202473 A1    Jul. 4, 2019

(30) Foreign Application Priority Data

Dec. 28, 2017 (JP) .............................. JP2017-253797

(51) Int. Cl.
*B60W 50/12* (2012.01)
*B60W 10/04* (2006.01)
(Continued)

(52) U.S. Cl.
CPC ............ *B60W 50/12* (2013.01); *B60W 10/04* (2013.01); *B60W 10/20* (2013.01); *B60W 30/18* (2013.01);
(Continued)

(58) Field of Classification Search
CPC ...... B60W 50/12; B60W 10/04; B60W 10/20; B60W 50/0097; B60W 30/18;
(Continued)

(56) References Cited

U.S. PATENT DOCUMENTS

| 8,670,891 B1* | 3/2014 | Szybalski | ............. B60W 10/30 701/23 |
| 2014/0244096 A1* | 8/2014 | An | ....................... G05D 1/0055 701/25 |

(Continued)

FOREIGN PATENT DOCUMENTS

| CN | 105988467 | 10/2016 |
| CN | 107187449 | 9/2017 |

(Continued)

OTHER PUBLICATIONS

Japanese Office Action for Japanese Patent Application No. 2017-253797 dated Dec. 1, 2020.

(Continued)

*Primary Examiner* — Russell Frejd
(74) *Attorney, Agent, or Firm* — Amin, Turocy & Watson, LLP

(57) ABSTRACT

A vehicle control system includes: a recognition unit (16, 321, or 322) recognizing a surrounding status of a vehicle; a control unit (200 or 300) executing driving support for the vehicle by controlling one or both of steering and acceleration/deceleration of the vehicle on the basis of the surrounding status recognized by the recognition unit; a reception unit (40 or 80) receiving an instruction relating to the driving support from a vehicle occupant of the vehicle; and an inhibition unit (130) inhibiting inactivation or reduction in functionality of the driving support using the control unit in a case in which a surrounding status of the vehicle is a predetermined surrounding status, or the predetermined surrounding status in the future is predicted in a case in which an instruction for inactivation or reduction in functionality of the driving support is received by the reception unit.

7 Claims, 7 Drawing Sheets

(51) Int. Cl.
    *B60W 10/20*     (2006.01)
    *B60W 50/00*     (2006.01)
    *B60W 30/18*     (2012.01)

(52) U.S. Cl.
    CPC ..... *B60W 50/0097* (2013.01); *B60W 2554/80* (2020.02); *B60W 2555/20* (2020.02); *B60W 2710/20* (2013.01); *B60W 2720/106* (2013.01)

(58) Field of Classification Search
    CPC ......... B60W 2554/80; B60W 2555/20; B60W 2710/20; B60W 2720/106; B60W 10/18; B60W 50/082; B60W 50/085; B60W 50/10; B60W 2540/12; B60W 30/182; B60W 40/02; B60W 40/00
    See application file for complete search history.

(56) References Cited

U.S. PATENT DOCUMENTS

| | | | | |
|---|---|---|---|---|
| 2016/0207536 | A1* | 7/2016 | Yamaoka | B60W 50/10 |
| 2017/0028987 | A1* | 2/2017 | Yamada | B60W 30/182 |
| 2019/0064800 | A1* | 2/2019 | Frazzoli | G05D 1/0223 |
| 2019/0064803 | A1* | 2/2019 | Frazzoli | G05D 1/0061 |

FOREIGN PATENT DOCUMENTS

| | | |
|---|---|---|
| CN | 107458378 | 12/2017 |
| JP | 10-309961 | 11/1998 |
| JP | 2016-088334 | 5/2016 |
| JP | 2016-175613 | 10/2016 |
| JP | 2016-193666 | 11/2016 |
| JP | 2017-191562 | 10/2017 |
| JP | 2017-207859 | 11/2017 |
| JP | 2017-214035 | 12/2017 |
| JP | 2017-214036 | 12/2017 |

OTHER PUBLICATIONS

Japanese Office Action for Japanese Patent Application No. 2017-253797 dated Jul. 13, 2021.
Chinese Office Action for Chinese Patent Application No. 201811553105.4 dated Sep. 13, 2021.

* cited by examiner

VEHICLE CONTROL SYSTEM, VEHICLE CONTROL METHOD, AND STORAGE MEDIUM

CROSS-REFERENCE TO RELATED APPLICATION

Priority is claimed on Japanese Patent Application No. 2017-253797, filed Dec. 28, 2017, the content of which is incorporated herein by reference.

BACKGROUND OF THE INVENTION

Field of the Invention

The present invention relates to a vehicle control system, a vehicle control method, and a storage medium.

Description of Related Art

Technologies for running a vehicle by automatically controlling one or both of the acceleration/deceleration and steering of the vehicle (hereinafter, referred to as "automated driving") have been researched. In relation to this, technologies are known which prohibit a transition from manual driving to automated driving in a case in which the detection accuracy of a sensor group required for automated driving including cameras and radars is degraded in accordance with nighttime and weather conditions such as heavy rain, fog, and the like, and the surrounding environment cannot be correctly detected which is required for automated driving (for example, Japanese Unexamined Patent Application First Publication No. 2016-88334).

SUMMARY OF THE INVENTION

However, in a conventional technique, there are cases in which the surrounding status of a vehicle is not considered in a case in which the degree of driving support is decreased from automated driving to manual driving. For this reason, depending on the surrounding status of a vehicle, there are cases in which it takes time for a vehicle occupant to recognize the surrounding status, and there is a likeliness that it may be difficult to execute manual driving.

An aspect of the present invention is in consideration of such situations, and one object thereof is to provide a vehicle control system, a vehicle control method, and a storage medium capable of inhibiting a decrease in the degree of driving support at an inappropriate time.

A vehicle control system, a vehicle control method, and a storage medium according to the present invention employ the following configurations.

(1) A vehicle control system according to one aspect of the present invention is a vehicle control system including: a recognition unit recognizing a surrounding status of a vehicle; a control unit executing driving support for the vehicle by controlling one or both of steering and acceleration/deceleration of the vehicle on the basis of the surrounding status recognized by the recognition unit; a reception unit receiving an instruction relating to the driving support from a vehicle occupant of the vehicle; and an inhibition unit inhibiting inactivation or reduction in functionality of the driving support using the control unit in a case in which a surrounding status of the vehicle is a predetermined surrounding status, or it is predicted that the predetermined surrounding status will be reached in the future in a case in which an instruction for inactivation or reduction in functionality of the driving support is received by the reception unit.

(2): In the aspect (1) described above, the control unit enables driving support of a first degree in a case in which a recognition level of the recognition unit is equal to or higher than a first threshold and enables driving support of a second degree in which less work than that for the first degree is imposed on a driver in a case in which the recognition level of the recognition unit is equal to or higher than a second threshold that is higher than the first threshold, and the inhibition unit inhibits inactivation or reduction in functionality of the driving support using the control unit in a case in which an instruction for inactivation or reduction in functionality of the driving support is received by the reception unit in a status in which the recognition level of the recognition unit is equal to or higher than the second threshold.

(3): In the aspect (1) described above, the inhibition unit predicts that a recognition state acquired by the recognition unit will be degraded in a case in which the vehicle runs in a predetermined running situation and inhibits inactivation or reduction in functionality of the driving support using the control unit in a case in which an instruction for inactivation or reduction in functionality of the driving support is received by the reception unit before the vehicle runs in the predetermined running situation.

(4): In the aspect (1) described above, an output unit outputting information and an output control unit causing the output unit to output an indication indicating whether or not inactivation or reduction in functionality of the driving support will be allowed in a case in which the surrounding status of the vehicle is a predetermined surrounding status or it is predicted that the predetermined surrounding status will be reached in the future in a case in which an instruction for inactivation or reduction in functionality of the driving support has been received by the reception unit may be further included.

(5): In the aspect (1) described above, the inhibition unit releases the inhibition of inactivation or reduction in functionality of the driving support using the control unit in a case in which the surrounding status recognized by the recognition unit is not the predetermined surrounding status or in a case in which a further change in the status in the future is not predicted after the predetermined surrounding status in a state in which inactivation or reduction in functionality of the driving support using the control unit is inhibited.

(6): In the aspect (1) described above, the reception unit includes a brake pedal, and, in a case in which an instruction for inactivation or reduction in functionality of the driving support is received by the brake pedal, the inhibition unit does not inhibit inactivation or reduction in functionality of the driving support using the control unit even in a case in which the surrounding status of the vehicle is a predetermined surrounding status, or the predetermined surrounding status in the future is predicted.

(7): A vehicle control method according to one aspect of the present invention is a vehicle control method using a computer. The vehicle control method includes: recognizing a surrounding status of a vehicle; executing driving support for the vehicle by controlling one or both of steering and acceleration/deceleration of the vehicle on the basis of the recognized surrounding status; receiving an instruction relating to the driving support from a vehicle occupant of the vehicle; and inhibiting inactivation or reduction in functionality of the driving support in a case in which a surrounding status of the vehicle is a predetermined surrounding status, or it is predicted that the predetermined surrounding status will be reached in the future in a case in which an instruction for inactivation or reduction in functionality of the driving support is received.

(8): A storage medium according to one aspect of the present invention is a computer-readable non-transitory storage medium having a program stored thereon, the program causing a computer to execute: recognizing a surrounding status of a vehicle; executing driving support for the vehicle by controlling one or both of steering and acceleration/deceleration of the vehicle on the basis of the recognized surrounding status; receiving an instruction relating to the driving support from a vehicle occupant of the vehicle; and inhibiting inactivation or reduction in functionality of the driving support in a case in which a surrounding status of the vehicle is a predetermined surrounding status, or it is predicted that the predetermined surrounding status will be reached in the future in a case in which an instruction for inactivation or reduction in functionality of the driving support is received.

According to the aspects (1) to (8) described above, a decrease in the degree of driving support at an inappropriate time can be inhibited.

DETAILED DESCRIPTION OF THE INVENTION

Hereinafter, a vehicle control system, a vehicle control method, and a storage medium according to embodiments of the present invention will be described with reference to the drawings. In the following embodiment, it is assumed that a vehicle control system is applied to an automated driving vehicle. Here, the automated driving represents running a vehicle by controlling one or both of steering control and speed control independently from a vehicle occupant's operation and is one type of driving support. In the embodiment, it is assumed that there are a first degree at which driving support is executed by operating driving support devices, such as for example, an adaptive cruise control system (ACC) and a lane keeping assistance system (LKAS) and a second degree at which the degree of control is higher than that of the first degree in the driving support. In driving support of the second degree, less work than that in the driving support of the first degree is imposed on a driver. Here, work imposed on a driver, for example, is surroundings monitoring, an operation of gripping a steering wheel, or the like. In this embodiment, driving support of the second degree is assumed to be automated driving. A "vehicle occupant" according to an embodiment, for example, is a vehicle occupant sitting on a driver's seat, in other words, a seat in which a driving operator is disposed.

[Overall Configuration]

Figure 1:
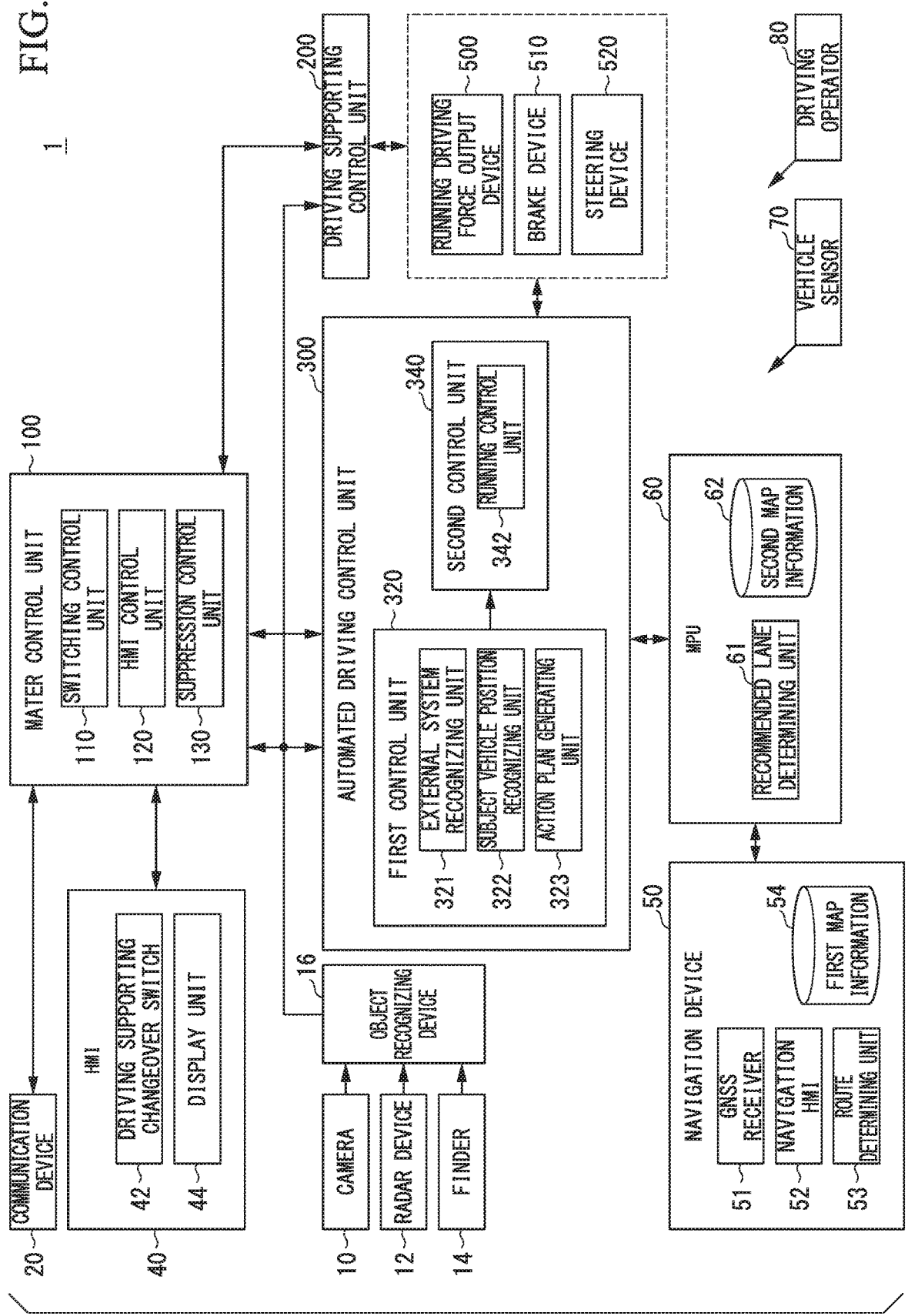
FIG. 1 is a configuration diagram of a vehicle system according to an embodiment.

FIG. 1 is a configuration diagram of a vehicle system 1 using a vehicle control device according to an embodiment. A vehicle in which the vehicle system 1 is mounted (hereinafter, referred to as a subject vehicle M) is, for example, a vehicle having two wheels, three wheels, four wheels, or the like, and a driving source thereof is an internal combustion engine such as a diesel engine or a gasoline engine, an electric motor, or a combination thereof. The electric motor operates using power generated using a power generator connected to an internal combustion engine or discharge power of a secondary cell or a fuel cell.

The vehicle system 1, for example, includes a camera 10, a radar device 12, a finder 14, an object recognizing device 16, a communication device 20, a human machine interface (HMI) 40, a navigation device 50, a map positioning unit (MPU) 60, a vehicle sensor 70, a driving operator 80, a vehicle indoor camera 90, a master control unit 100, a driving support control unit 200, an automated driving control unit 300, a running driving force output device 500, a brake device 510, and a steering device 520. Such devices and units are interconnected using a multiplex communication line such as a controller area network (CAN) communication line, a serial communication line, a radio communication network, or the like. The configuration shown in FIG. 1 is merely one example, and thus, a part of the configuration may be omitted, and, furthermore, other components may be added thereto. A combination of the object recognizing device 16, an external system recognizing unit 321, and a subject vehicle position recognizing unit 322 is one example of a "recognition unit." A combination of the driving support control unit 200 and the automated driving control unit 300 is one example of a "control unit." The HMI 40 is one example of an "output unit." The HMI control unit 120 is one example of an "output control unit." The inhibition control unit 130 is one example of a "inhibition unit." A combination of the HMI 40 and the driving operator 80 is one example of a "reception unit."

The camera 10 generates a captured image by imaging the vicinity of the subject vehicle M. The camera 10, for example, may be a digital camera using a solid-state imaging device such as a charge coupled device (CCD) or a complementary metal oxide semiconductor (CMOS). The camera 10 is installed at an arbitrary place on the subject vehicle M in which the vehicle system 1 is mounted. The vicinity of the subject vehicle M includes the side in front of the subject vehicle and may include the lateral sides or the side to the rear of the subject vehicle. In a case in which the side in front is to be imaged, the camera 10 is installed at an upper part of a front windshield, a rear face of a rear-view mirror, or the like. In a case in which the side to the rear is to be imaged, the camera 10 is installed at an upper part of a rear windshield, a back door, or the like. In a case in which the lateral side is to be imaged, the camera 10 is installed on a door mirror or the like. The camera 10, for example, images the vicinity of the subject vehicle M periodically and repeatedly. The camera 10 may be a stereo camera.

The radar device 12 emits radiowaves such as millimeter waves to the vicinity of the subject vehicle M and detects at least a position of (a distance and an azimuth to) an object by detecting radiowaves (reflected waves) reflected by the object. One or a plurality of radar devices 12 are installed at arbitrary places on the subject vehicle M. The radar device 12 may detect a position and a speed of an object using a frequency modulated continuous wave (FMCW) system.

The finder 14 is a light detection and ranging or laser imaging detection and ranging (LIDAR) finder that determines a distance to a target by measuring scattered light from emitted light. One or a plurality of finders 14 are mounted at arbitrary positions on the subject vehicle M.

The object recognizing device 16 may perform a sensor fusion process on results of detection using some or all of the camera 10, the radar device 12, and the finder 14, thereby allowing recognition of a surrounding status of the subject vehicle M. The object recognizing device 16 may recognize a position, a type, a speed, and the like of an object present in the vicinity of the subject vehicle M. The object recognizing device 16 outputs results of recognition to the master control unit 100, the driving support control unit 200, and the automated driving control unit 300.

The communication device 20, for example, communicates with other vehicles present in the vicinity of the subject vehicle M using a cellular network, a Wi-Fi network, Bluetooth (registered trademark), dedicated short range communication (DSRC), or the like or communicates with various server apparatuses through a radio base station.

The HMI 40 presents various types of information to an occupant of the subject vehicle M and receives an input operation performed by a vehicle occupant. The HMI 40, for example includes a driving support changeover switch 42 and a display unit 44. The HMI 40 may include a speaker, a microphone, a light emitting unit, a buzzer, a touch panel, various operation switches, keys, and the like. Devices included in the HMI 40, for example, are mounted at an arbitrary position on each part of an instrument panel, a driver's seat, and a steering wheel.

The driving support changeover switch 42 receives an operation of starting driving support for the subject vehicle M. Starting driving support, for example, is execution of driving support of the first degree or the second degree. The driving support changeover switch 42 receives an instruction for inactivation or reduction in functionality of driving support for the subject vehicle M (an instruction for inactivation of driving support or an instruction for reduction in functionality of driving support). In activation of driving support, for example, is stopping driving support using the driving support control unit 200 and the automated driving control unit 300. Reduction in functionality of the driving support, for example, is switching the degree of the driving support from the second degree to the first degree. In a case in which the driving support changeover switch 42 has not been operated or in a case in which an operation of inactivation of driving support is received in accordance with the driving support changeover switch 42, manual driving according to a vehicle occupant is executed. In manual driving, the running driving force output device 500, the brake device 510, and the steering device 520 are controlled in accordance with the amount of operation of driving operators 80.

The display unit 44, for example, is a liquid crystal display (LCD) or an organic electroluminescence (EL) display. The display unit 44 may be a touch panel integrated with a touch pad. The display unit 44 is disposed near the front face of a driver's seat in the instrument panel or at the center part of the instrument panel. The display unit 44 may be a head up display (HUD). In such a case, the display unit 44 allows the eyes of the vehicle occupant to visually recognize a virtual image by projecting an image onto a part of the front windshield in front of the driver's seat.

The navigation device 50, for example, includes a global navigation satellite system (GNSS) receiver 51, a navigation HMI 52, and a route determining unit 53 and stores first map information 54 in a storage device such as a hard disk drive (HDD) or a flash memory. The GNSS receiver 51 identifies a position of a subject vehicle M on the basis of signals received from GNSS satellites. The position of the subject vehicle M may be identified or complemented by an inertial navigation system (INS) using an output of the vehicle sensor 70. The navigation HMI 52 includes a display device, a speaker, a touch panel, a key, and the like. A part or the whole of the navigation HMI 52 and the HMI 40 to be described later may be configured to be shared. The route determining unit 53, for example, determines a route to a destination input by a vehicle occupant using the navigation HMI 52 (for example, including information relating to transit points when running up to a destination) from a position of the subject vehicle M specified by the GNSS receiver 51 (or an input arbitrary position) by referring to the first map information 54. The first map information 54, for example, is information in which a road form is represented by respective links representing a road and respective nodes connected using the links. The first map information 54 may include a curvature of each road, point of interest (POI) information, and the like. The route determined by the route determining unit 53 is output to the MPU 60. In addition, the navigation device 50 may perform route guidance using the navigation HMI 52 on the basis of the route determined by the route determining unit 53.

The MPU 60, for example, functions as a recommended lane determining unit 61 and stores second map information 62 in a storage device such as an HDD or a flash memory. The recommended lane determining unit 61 divides a route provided from the navigation device 50 into blocks and determines a recommended lane for each block by referring to the second map information 62.

The second map information 62 is map information having an accuracy higher than that of the first map information 54. The second map information 62, for example, includes information of the center of respective lanes, information on boundaries between lanes, road information, traffic regulations information, address information, facilities information, telephone number information, and the like. The second map information 62 may include information relating to a section in which a lane change can be made and a section in which overtaking can be performed.

The vehicle sensor 70 includes a vehicle speed sensor that detects a speed of the subject vehicle M, an acceleration sensor that detects an acceleration, a yaw rate sensor that detects an angular velocity around a vertical axis, an azimuth sensor that detects the direction of the subject vehicle M, and the like.

The driving operator 80, for example, includes an acceleration pedal, a brake pedal, a shift lever, a steering wheel, and other operators. A sensor detecting the amount of an operation or the presence/absence of an operation is installed in the driving operator 80, and a result of the detection is output the master control unit 100, the driving support control unit 200, and the automated driving control unit 300 or one or more of the running driving force output device 500, the brake device 510, and the steering device 520.

[Master Control Unit]

The master control unit 100, for example, includes a switching control unit 110, an HMI control unit 120, and an inhibition control unit 130. Such constituent elements, for example, are realized by a hardware processor such as a central processing unit (CPU) executing a program (software). Some or all of such constituent elements may be realized by hardware (a circuit; including a circuitry) such as a large scale integration (LSI), an application specific integrated circuit (ASIC), a field-programmable gate array (FPGA), or a graphics processing unit (GPU) or may be realized by cooperation between software and hardware.

The switching control unit 110 inhibits or executes driving support switching control on the basis of an instruction from the inhibition control unit 130. For example, in a case in which an instruction for execution of switching control is received from the inhibition control unit 130, the switching control unit 110 executes start or end of the driving support or switching of the degree of the driving support on the basis of an operation signal received by the driving support changeover switch 42. In a case in which an instruction for execution of switching control is received from the inhibition control unit 130, the switching control unit 110 may end the driving support and switch the driving mode to the manual driving on the basis of an operation directing acceleration, deceleration, or steering for the driving operator 80 such as the acceleration pedal, the brake pedal, or the steering wheel.

The HMI control unit 120 outputs information relating to switching between operation and inactivation of the driving support, information relating to the degree of the driving support, or the like to the HMI 40. The HMI control unit 120 may output the information received by the HIM 40 to one or both of the driving support control unit 200 and the automated driving control unit 300.

In a case in which an instruction for inactivation or reduction in functionality of the driving support is received from the driving support changeover switch 42 or the driving operator 80, the inhibition control unit 130 inhibits switching control of the degree of the driving support using the switching control unit 110 in a case in which the surrounding status of the subject vehicle M is a predetermined status, or it is predicted that the predetermined surrounding status will be reached in the future. Details of the function of the inhibition control unit 130 will be described later

[Driving Support Control Unit]

The driving support control unit 200 executes driving support of the first degree in accordance with an instruction from the master control unit 100. The driving support control unit 200, for example, executes the ACC, the LKAS, or any other driving support control. For example, in order to execute the ACC, the driving support control unit 200 performs control of the running driving force output device 500 and the brake device 510 such that the subject vehicle M is run in a state in which an inter-vehicle distance between the subject vehicle M and a preceding vehicle is kept to be constant on the basis of information input from the camera 10, the radar device 12, and the finder 14 through the object recognizing device 16. In other words, the driving support control unit 200 executes acceleration/deceleration control (speed control) based on an inter-vehicle distance from a preceding vehicle.

In other to execute the LKAS, the driving support control unit 200 performs control of the steering device 520 such that the subject vehicle M runs while keeping the running lane in which the subject vehicle M is currently running (lane keeping). In other words, the driving support control unit 200 executes steering control for keeping the lane. Relating to types of the driving support of the first degree, various kinds of control other than automated driving (driving support of the second degree) not requiring an operation for the driving operator 80 may be included therein.

[Automated Driving Control Unit]

The automated driving control unit 300 executes driving support of the second degree in accordance with an instruction from the master control unit 100. The automated driving control unit 300, for example, includes a first control unit 320 and a second control unit 340. Each of the first control unit 320 and the second control unit 340 is realized by a processor such as a CPU executing a program. Some or all of such functional units may be realized by hardware such as an LSI, an ASIC, or an FPGA or may be realized by cooperation between software and hardware.

The first control unit 320, for example, includes an external system recognizing unit 321, a subject vehicle position recognizing unit 322, and an action plan generating unit 323. The external system recognizing unit 321 recognizes states of each surrounding vehicle such as a position, a speed, an acceleration, and the like thereof on the basis of information input from the camera 10, the radar device 12, and the finder 14 through the object recognizing device 16. The position of a surrounding vehicle may be represented as a representative point on the surrounding vehicle such as the center of gravity, a corner, or the like of the surrounding vehicle and may be represented by an area represented by the contour of the surrounding vehicle. The "state" of a surrounding vehicle may include an acceleration, a jerk, or an "action state" (for example, executing a lane change or whether or not a lane is going to be changed) of the surrounding vehicle.

The external system recognizing unit 321 may recognize at least one of the surrounding vehicle described above, an obstacle (for example, a guard rail, an electric pole, a parked vehicle, or a person such as a pedestrian), a road form and other objects.

The subject vehicle position recognizing unit 322, for example, recognizes a lane in which the subject vehicle M is running (running lane) and a relative position and a relative posture of the subject vehicle M with respect to the running lane. For example, the subject vehicle position recognizing unit 322 compares a pattern of road partition lines acquired from the second map information 62 (for example, an array of solid lines and broken lines) with a pattern of road partition lines in the vicinity of the subject vehicle M that has been recognized from an image captured by the camera 10, thereby recognizing a running lane. The subject vehicle position recognizing unit 322 may recognize a position and a posture of the subject vehicle M with respect to the running lane.

The action plan generating unit 323 generates an action plan for executing automated driving of the subject vehicle M toward a destination or the like. For example, the action plan generating unit 323 determines events to be sequentially executed in automated driving control such that the subject vehicle runs in a recommended lane determined by the recommended lane determining unit 61, and the surrounding status of the subject vehicle M is responded. For example, as events in automated driving, there are a constant-speed running event of running in the same running lane at a constant speed, a low-speed following event of following a preceding vehicle under a condition of a low speed (for example, 40 [km/h] or less), a lane change event of changing the running lane of the subject vehicle M, an overtaking event of overtaking a preceding vehicle, a merge event of allowing a vehicle to merge at a merging point, a branching event of causing the subject vehicle M to run in a direction of the target at a branching point of a road, an emergency stop event of emergently stopping the subject vehicle M, and the like. In the middle of execution of such an event, there are cases in which an action for avoidance is planned on the basis of the surrounding status (presence of a surrounding vehicle or pedestrians, lane constriction due to road construction, or the like) of the subject vehicle M. The action plan generating unit 323 generates a target locus along which the subject vehicle M will run in the future in association with various events described above. The target locus is represented by sequentially aligning points (locus points) at which the subject vehicle M is to arrive.

The second control unit 340, for example, includes a running control unit 342. The running control unit 342 performs control of the running driving force output device 500, the brake device 510, and the steering device 520 such that the subject vehicle M passes through a target locus generated by the action plan generating unit 323 at a scheduled time.

The running driving force output device 500 outputs a running driving force (torque) used for running the vehicle to driving wheels. For example, the running driving force output device 500 includes a combination of an internal combustion engine, an electric motor, a transmission gear, and the like and an engine control unit (ECU) controlling these. The brake device 510, for example, includes a brake caliper, a cylinder delivering hydraulic pressure to the brake caliper, an electric motor generating hydraulic pressure in the cylinder, and a brake ECU. The brake ECU performs control of the electric motor in accordance with information input from the running control unit 342 or information input from the driving operator 80 such that a brake torque according to a braking operation is output to each vehicle wheel. The steering device 520, for example, includes a steering ECU and an electric motor. The steering ECU changes the direction of the steering wheel by driving the electric motor in accordance with information input from the running control unit 342 or information input from the driving operator 80.

[Function of Inhibition Control Unit]

Figure 2:
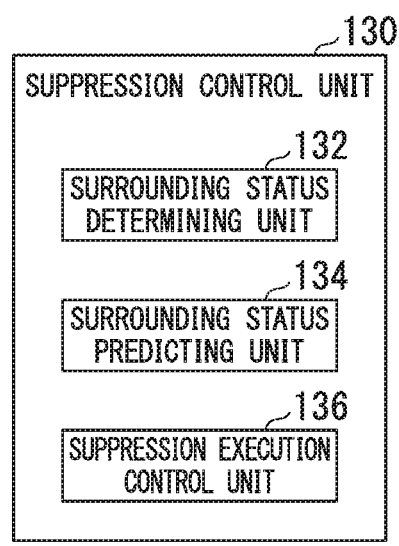
FIG. 2 is a functional configuration diagram of an inhibition control unit.

Next, the function of the inhibition control unit 130 according to an embodiment will be described. In the following description, a case in which an instruction for inactivation or reduction in functionality of the driving support is received in accordance with the driving support changeover switch 42 will be mainly described. FIG. 2 is a functional configuration diagram of the inhibition control unit 130. The inhibition control unit 130, for example, includes a surrounding status determining unit 132, a surrounding status predicting unit 134, and an inhibition execution control unit 136.

The surrounding status determining unit 132 determines whether or not the surrounding status of the subject vehicle M is a predetermined surrounding status on the basis of the surrounding status of the subject vehicle M recognized by the object recognizing device 16 and the map information (the first map information 54 and the second map information 62). The predetermined surrounding status, for example, is a status such as "a road on which the subject vehicle M is running is a curved road," "the brightness of the surrounding changes due to the subject vehicle M running in a tunnel," "the field of view is degraded due to bad weather (heavy rain or the like)," or "dazzling due to the sun shining toward the face of a vehicle occupant," or the like.

The surrounding status predicting unit 134 predicts whether the surrounding status of the subject vehicle M becomes a predetermined status in the near future. Here, the near future, for example, represents after several seconds, after several minutes, or the like.

In a case in which an instruction for inactivation or reduction in functionality of the driving support is received in accordance with the driving support changeover switch 42, the inhibition execution control unit 136 determines whether or not inactivation or reduction in functionality of the driving support is inhibited on the basis of a result of the determination acquired by the surrounding status determining unit 132 and a result of the prediction acquired by the surrounding status predicting unit 134. More specifically, in a case in which an instruction for inactivation or reduction in functionality of the driving support is received in accordance with the driving support changeover switch 42, in a case in which the surrounding status of the subject vehicle M is determined as being a predetermined surrounding status by the surrounding status determining unit 132 or in a case in which the surrounding status of the subject vehicle M is predicted to be a predetermined surrounding status in the future by the surrounding status predicting unit 134, the inhibition execution control unit 136 determines to inhibit inactivation or reduction in functionality of the driving support. In a case in which the surrounding status of the subject vehicle M is not a predetermined surrounding status or in a case in which it is predicted that the predetermined surrounding status will not be reached in the future, the inhibition execution control unit 136 determines not to inhibit inactivation or reduction in functionality of the driving support.

On the basis of a result of the determining of whether to inhibit or not, the inhibition execution control unit 136 causes the switching control unit 110 to execute switching control of driving support. For example, in a case in which inhibition of inactivation or reduction in functionality of the driving support is determined, the inhibition execution control unit 136 outputs an instruction for inhibiting driving support switching to the switching control unit 110. On the other hand, in a case in which no inhibition is determined, the inhibition execution control unit 136 outputs an instruction for executing driving support switching to the switching control unit 110. The inhibition execution control unit 136 may output an instruction for execution of driving support switching to the switching control unit 110 only in a case in which no inhibition is determined.

Figure 3:
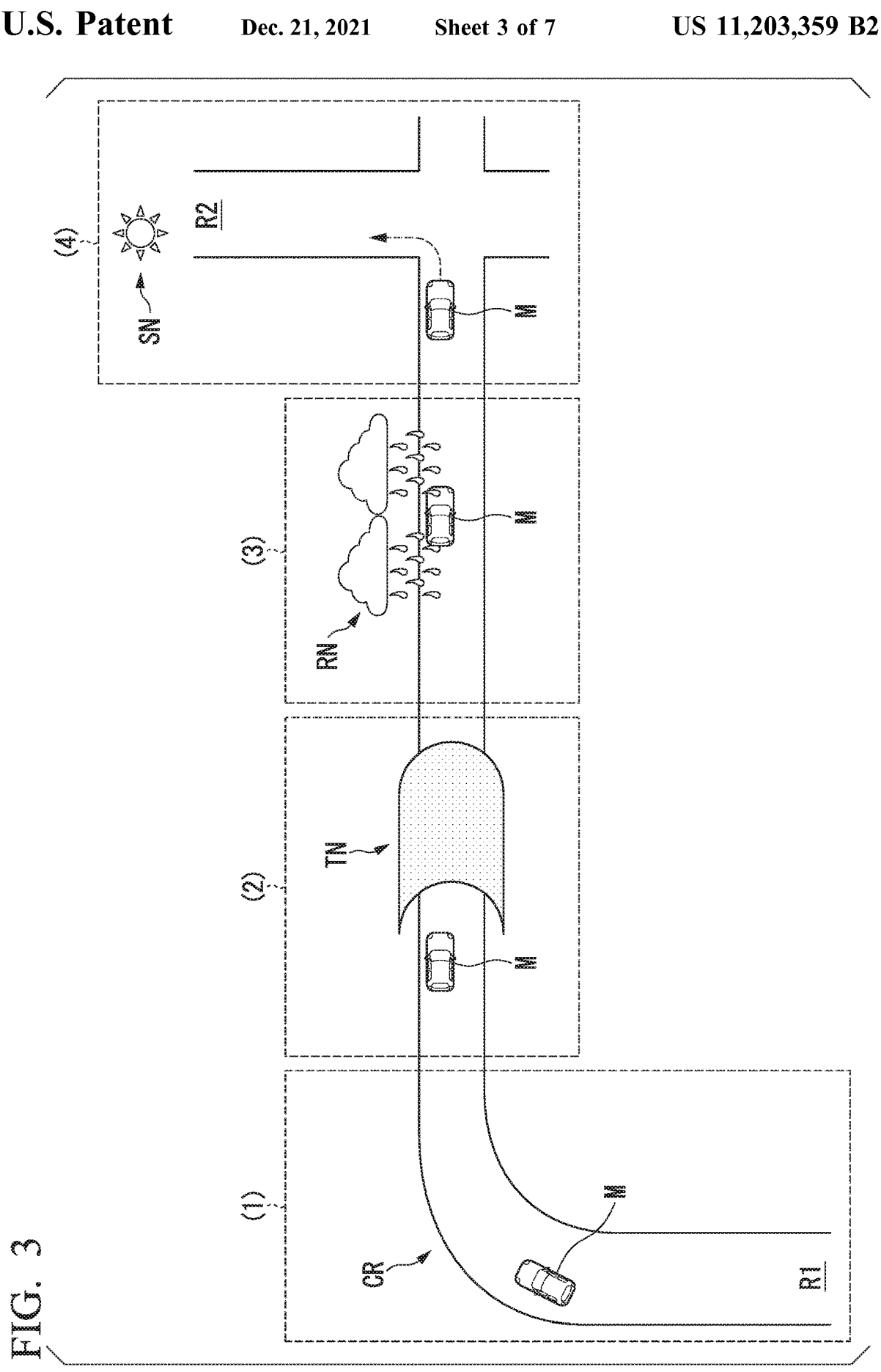
FIG. 3 is a diagram showing one example of a process of the inhibition control unit for each running situation.

Hereinafter, a process of the inhibition control unit 130 for each running situation corresponding to a predetermined surrounding status will be described. FIG. 3 is a diagram showing one example of the process of the inhibition control unit 130 for each running situation.

<Running Situation (1)>

A running situation (1) shown in FIG. 3 represents a situation in which a subject vehicle M running on a road R1 is running on a curved road CR. In the running situation (1), the surrounding status determining unit 132 determines that the subject vehicle M is running on a curved road CR in a case in which the form of a road present at a matching position is a curved road CR by collating positional information of the subject vehicle M with positional information included in the map information. The surrounding status determining unit 132 may detect a steering angle of the subject vehicle M and determine that the subject vehicle M is running on a curved road CR in a case in which the detected steering angle is equal to or larger than a predetermined angle, and the subject vehicle has run in that state for a predetermined distance or more.

On the basis of a target locus generated by the action plan generating unit 323 and the map information, the surrounding status predicting unit 134 determines whether or not the subject vehicle M is going to run on a curved road CR in the near future. For example, the surrounding status predicting unit 134 refers to the map information on the basis of each locus point included in the target locus and, in a case in which a form of a road present at a position corresponding to the position of the locus point is a curved road CR, predicts that the subject vehicle M is going to run on a curved road CR in the near future. The surrounding status predicting unit 134 may predict that the subject vehicle will run on a curved road CR in a case in which the radius of curvature formed by the target locus is equal to or less than a predetermined value.

In a case in which an instruction for inactivation or reduction in functionality of the driving support is received in accordance with the driving support changeover switch 42, in a case in which it is determined that the subject vehicle M is running on a curved road CR or in a case in which the subject vehicle M is predicted to run on a curved road CR in the future, the inhibition execution control unit 136 inhibits inactivation or reduction in functionality of the driving support. In this way, under a status in which the risk of driving executed by a vehicle occupant is predicted to increase by executing inactivation or reduction in functionality of driving support on a curved road CR, the driving support can be continued.

<Running Situation (2)>

A running situation (2) shown in FIG. 3 represents a view in which a subject vehicle M running on a road R1 is going to run inside a tunnel TN in the near future. In the running situation (2), the surrounding status determining unit 132 collates positional information of the subject vehicle M with positional information included in the map information and determines that the subject vehicle M is running inside a tunnel TN in a case in which a road present at a matching position is a road inside the tunnel TN.

On the basis of a target locus generated by the action plan generating unit 323 and the map information, the surrounding status predicting unit 134 determines whether or not the subject vehicle M is going to run inside a tunnel TN in the near future. For example, the surrounding status predicting unit 134 refers to the map information on the basis of each locus point included in the target locus and, in a case in which a tunnel TN is present at a position corresponding to the position of the locus point, predicts that the subject vehicle M is going to run inside the tunnel TN in the near future. The surrounding status predicting unit 134 refers to the map information on the basis of locus points included in the target locus and, in a case in which the subject vehicle is going to come out from a tunnel TN at a position corresponding to the position of a locus point, may predict that the subject vehicle M is going to come out of the tunnel TN and run in the near future.

In a case in which an instruction for inactivation or reduction in functionality of the driving support is received in accordance with the driving support changeover switch 42, in a case in which it is determined that the subject vehicle M is running inside a tunnel TN or in a case in which the subject vehicle M is predicted to run inside a tunnel TN in the future, the inhibition execution control unit 136 inhibits inactivation or reduction in functionality of the driving support. In this way, in a view in which the brightness (luminance) of the surroundings changes, and it becomes difficult to see the surroundings due to passage inside the tunnel TN, by continuing the driving support, a risk of driving executed by a vehicle occupant can be decreased.

<Running Situation (3)>

A running situation (3) shown in FIG. 3 represents a view in which a subject vehicle M is running on a road R1 during heavy rain RN. Here, for example, the heavy rain is a case in which the amount of rainfall is equal to or greater than a predetermined amount in a predetermined time. The heavy rain includes temporary local severe rain. In this case, the surrounding status determining unit 132, for example, estimates the weather of a position at which the subject vehicle is running by analyzing an image captured by the camera 10 and determines that the surrounding status of the subject vehicle M is heavy rain in a case in which the weather indicates an amount of rainfall that is equal to or greater than a predetermined amount.

The surrounding status predicting unit 134 accesses an external server that manages a weather condition through the communication device 20 and predicts whether the subject vehicle M is going to pass through a heavy rain area in the future on the basis of the weather of an area of the running route of the subject vehicle M in the future that is acquired from the external server.

In a case in which an instruction for inactivation or reduction in functionality of the driving support is received in accordance with the driving support changeover switch 42, in a case in which it is determined that the surrounding of the subject vehicle M is in heavy rain RN or in a case in which the subject vehicle M is predicted to run in heavy rain RN in the future, the inhibition execution control unit 136 inhibits inactivation or reduction in functionality of the driving support. In this way, by inhibiting inactivation or reduction in functionality of the driving support under a road environment having poor visibility due to bad weather, the risk of driving executed by a vehicle occupant can be decreased.

<Running Situation (4)>

A running situation (4) shown in FIG. 3 represents a view in which a subject vehicle M running on a road R1 makes a left turn in the direction of a road R2 at the intersection. In the running situation (4), it is assumed that the sun SN is present in front of the subject vehicle M after the left turn. In this case, the surrounding status determining unit 132, for example, estimates a position and a direction of the sun SN with respect to the subject vehicle M by analyzing an image captured by the camera 10 after the left turn and determines whether or not the sun SN is present in front of the subject vehicle M.

The surrounding status predicting unit 134 predicts that the sun SN is present in front of the subject vehicle M in a case in which a left turn is made at the intersection on the basis of the surrounding weather, an advancement direction with respect to the road R2, date and time information at which the subject vehicle runs on the road R2, and the like. The surrounding status predicting unit 134 may analyze an image captured by the camera 10 and predict the presence of the sun SN in the direction of the road R2 before the left turn at the intersection on the basis of positions and directions of the shadows of surrounding objects, a distribution of brightness inside the image area, and the like acquired as a result of the analysis.

In a case in which an instruction for inactivation or reduction in functionality of the driving support is received in accordance with the driving support changeover switch 42, in a case in which it is predicted that the sun SN is present in front of the subject vehicle M or in a case in which the sun SN is predicted to be present in front of the subject vehicle M in the future, the inhibition execution control unit 136 inhibits inactivation or reduction in functionality of the driving support. In this way, by inhibiting non-operation or reduction in functionality of the driving support in a situation in which it becomes difficult for a vehicle occupant to visually recognize the side in front due to glaring according to shinning of the sun, a risk of driving executed by the vehicle occupant can be decreased.

As an example other than the running situations described above, for example, there is a case in which a vehicle occupant is dazzled in accordance with a highlight display of an oncoming vehicle in nigh-time driving of the subject vehicle M or a case in which the vehicle occupant is predicted to be dazzled in the near future. In such a case, in the inhibition execution control unit 136, a similar process is executed with the sun described in the running situation (4) substituted with another vehicle.

In each of the running situations described above, there are cases in which a recognition level (recognition accuracy) of the object recognizing device 16 is lowered, and the driving support that is in the middle of execution cannot be continued. In such cases, the inhibition execution control unit 136 may perform a determination of whether or not inactivation or reduction in functionality of the driving support can be inhibited on the basis of the recognition level of the object recognizing device 16.

Figure 4:
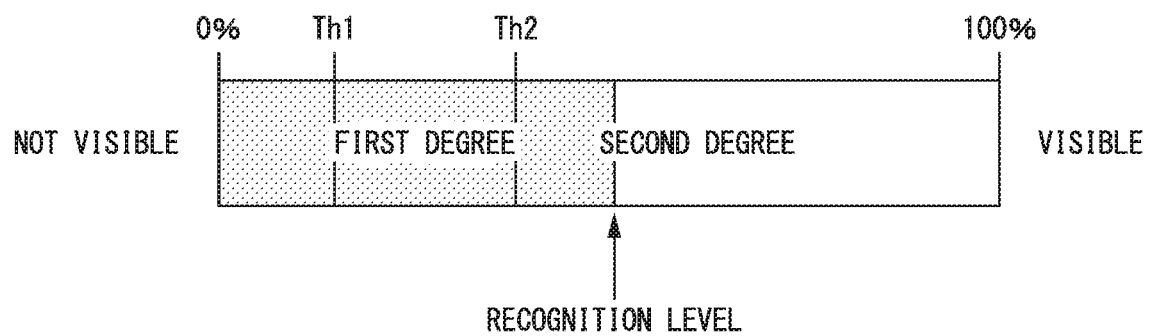
FIG. 4 is a diagram showing one example of a process of an inhibition execution control unit.

FIG. 4 is a diagram showing one example of a process of the inhibition execution control unit 136. In the example shown in FIG. 4, the recognition level of the surrounding status acquired by the object recognizing device 16 using the camera 10, the radar device 12, and the finder 14 is illustrated in the range of 0 to 100 [%]. As a value of the recognition level increases, a recognition accuracy becomes higher.

The recognition level, for example, is derived on the basis of a degree of matching between process results of devices or a degree of matching between process results in a time series in the process results acquired by the camera 10, the radar device 12, the finder 14, and the object recognizing device 16. The recognition level may be derived further on the basis of the state of the malfunction of each device or external environments of the subject vehicle M (for example, the weather, the brightness of the surroundings, the degree of congestion of objects, and the like). The recognition level may be derived either by the object recognizing device 16 or by the external system recognizing unit 321. Values derived by internal integrated circuits (ICs) or the like of the camera 10, the radar device 12, and the finder 14 may be taken into account for the recognition level.

In the example shown in FIG. 4, in a case in which the recognition level of the object recognizing device 16 is equal to or higher than a first threshold Th1 and is lower than a second threshold that is higher than the first threshold Th1, the inhibition execution control unit 136 determines that driving support of the first degree using the driving support control unit 200 can be executed. On the other hand, in a case in which the recognition level of the object recognizing device 16 is equal to or higher than the second threshold Th2, the inhibition execution control unit 136 determines that driving support of the second degree using the automated driving control unit 300 can be executed. Then, in a status in which the recognition level of the object recognizing device 16 is equal to or higher than the second threshold, in a case in which an instruction for inactivation or reduction in functionality of the driving support is received in accordance with the driving support changeover switch 42, the inhibition execution control unit 136 inhibits inactivation or reduction in functionality of the driving support. In this way, in a status in which the driving support of the second degree can be executed by the vehicle system 1, the driving support can be appropriately continued.

The HMI control unit 120 may notify a vehicle occupant of the recognition level by displaying the recognition level on the display unit 44. In such a case, in order to allow the vehicle occupant to easily visually recognize the recognition level, text data such as "visible" or "not visible" as shown in FIG. 4 may be displayed together with the recognition level.

Figure 5:
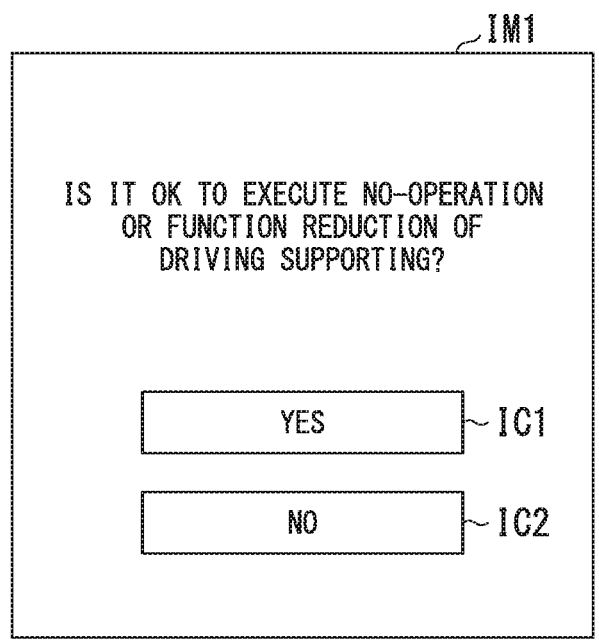
FIG. 5 is a diagram showing one example of an image displayed on a display unit.

In a case in which an instruction for inactivation or reduction in functionality of the driving support is received in accordance with the driving support changeover switch 42, in a case in which the surrounding status of the subject vehicle M is a predetermined surrounding status, or the predetermined surrounding status in the future is predicted, the inhibition execution control unit 136 may inquire a vehicle occupant whether or not it is allowed to execute the non-operation or reduction in functionality of the driving support and execute inhibition control on the basis of a result of the inquiry. In such a case, the inhibition execution control unit 136 displays an image used for inquiring a vehicle occupant whether or not it is allowed to execute inactivation or reduction in functionality of the driving support, which is generated by the HMI control unit 120, on the display unit 44. FIG. 5 is a diagram showing one example of an image IM1 displayed on the display unit 44. In the image IM1, information indicating an inquiry on whether or not it is allowed to execute inactivation or reduction in functionality of the driving support for a vehicle occupant is displayed, and an icon IC1 of a YES button and an icon IC2 of a NO button used for allowing a vehicle occupant to indicate agreement and disagreement are displayed.

In a case in which the icon IC1 is selected by the vehicle occupant, the inhibition execution control unit 136 executes inactivation or reduction in functionality of the driving support. On the other hand, in a case in which the icon IC2 is selected by the vehicle occupant, the inhibition execution control unit 136 inhibits inactivation or reduction in functionality of the driving support. In a case in which neither the icon IC1 nor the icon IC2 is selected by the vehicle occupant, the inhibition execution control unit 136 may inhibit inactivation or reduction in functionality of the driving support. In this way, inactivation or reduction in functionality of the driving support in accordance with a vehicle occupant's erroneous operation of the driving support changeover switch 42 can be inhibited. By executing inactivation or reduction in functionality of driving support after inquiring of a vehicle occupant's intention, inactivation or reduction in functionality of the driving support can be executed at a more appropriate time.

Figure 6:
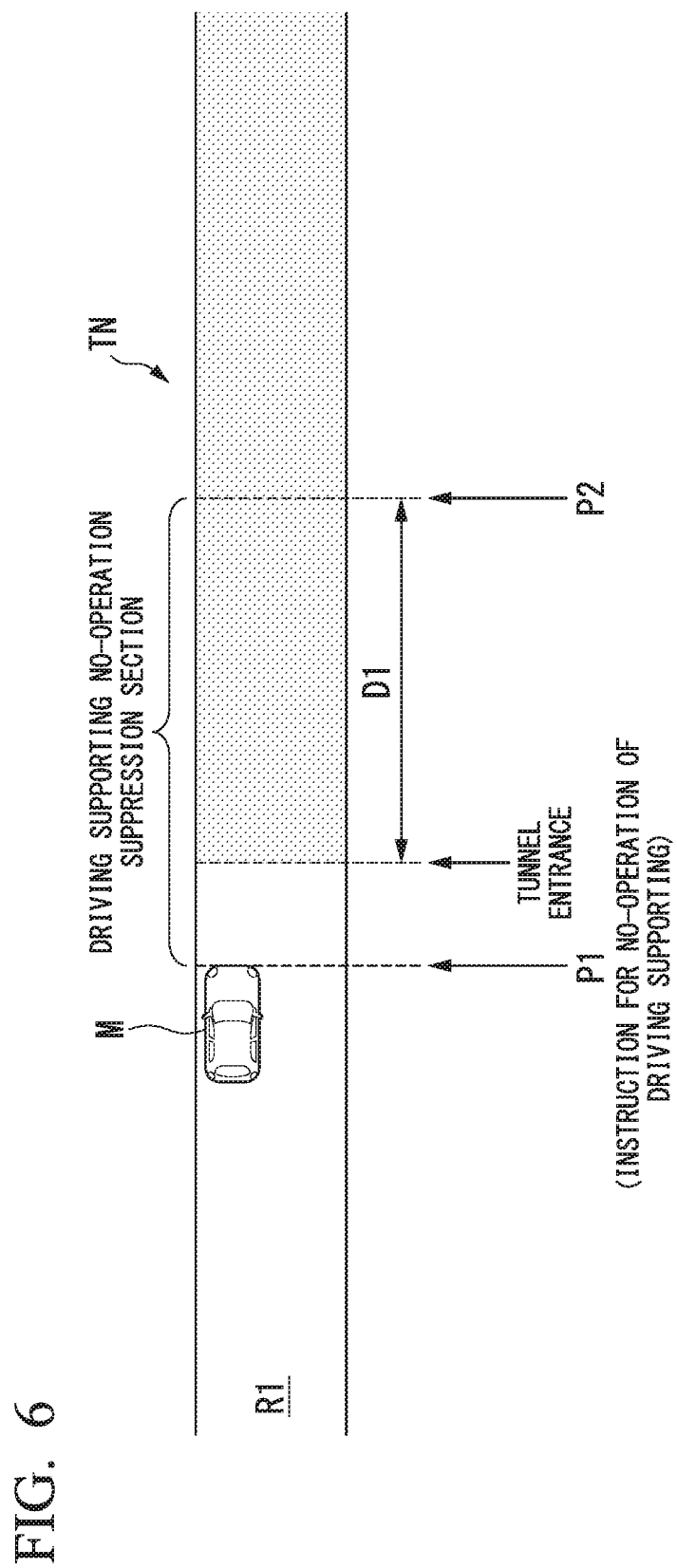
FIG. 6 is a diagram showing a time at which inhibition of inactivation of driving support is released by the inhibition execution control unit.

After inhibiting inactivation or reduction in functionality of the driving support, in a case in which the surrounding status of the subject vehicle M is not a predetermined surrounding status or in a case in which a further change in the status after the predetermined surrounding status in the future is not predicted, the inhibition execution control unit 136 releases the inhibition of inactivation or reduction in functionality of the driving support. FIG. 6 is a diagram showing a time at which inhibition of inactivation of driving support is released by the inhibition execution control unit 136. In the example shown in FIG. 6, a view in which a subject vehicle M running on a road R1 passes through a tunnel is illustrated. For example, an instruction for inactivation is assumed to be received in accordance with the driving support changeover switch 42 at a point P1 before running through a tunnel TN. In this case, since the subject vehicle M is predicted to run inside the tunnel TN in the near future, the inhibition execution control unit 136 inhibits inactivation of the driving support before actually running inside the tunnel TN.

Then, the inhibition execution control unit 136 determines whether or not the subject vehicle M has run a predetermined distance D1 or more from a tunnel entrance at which the surrounding brightness is predicted to change on the basis of the positional information of the subject vehicle M. In a case in which it is determined that the subject vehicle has run the predetermined distance D1 or more from the tunnel entrance, the inhibition execution control unit 136 releases inactivation of the driving support. Accordingly, in the example shown in FIG. 6, a section from a point P1 to a point P2 is a section in which the non-operation of the driving support is inhibited. The inhibition execution control unit 136 may release the inhibition when a predetermined time elapses after the inhibition of inactivation or reduction in functionality of the driving support is started. In this way, the driving mode can be switched to manual driving under a situation in which a vehicle occupant is predicted to be accustomed to the surrounding status after a change.

[Process Flow]

Figure 7:
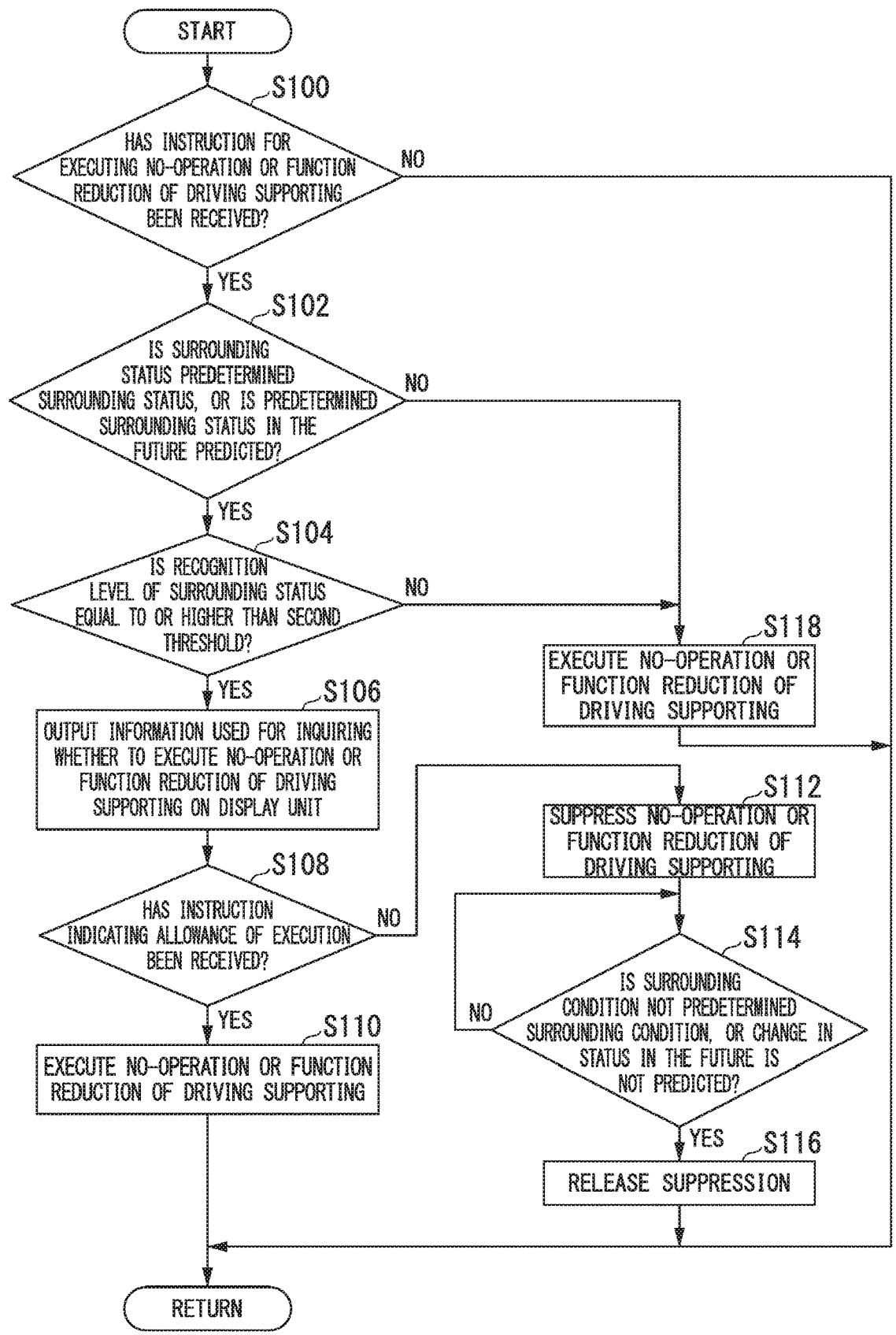
FIG. 7 is a flowchart showing one example of the flow of a process executed by the inhibition control unit.

FIG. 7 is a flowchart showing one example of the flow of a process executed by the inhibition control unit 130. The process shown in FIG. 7, for example, is repeatedly executed at a predetermined time in the middle of execution of driving support. In the example shown in FIG. 7, it is assumed that a recognition process using the object recognizing device 16 is executed, and driving support of the second degree is executed for a subject vehicle M.

In the example shown in FIG. 7, first, the inhibition execution control unit 136 determines whether or not an instruction for executing inactivation or reduction in functionality of the driving support for the subject vehicle M has been received (Step S100). In a case in which it is determined that the instruction for executing inactivation or reduction in functionality of the driving support for the subject vehicle M has been received, the inhibition execution control unit 136 determines whether or not the surrounding status of the subject vehicle M is a predetermined surrounding status, or a predetermined surrounding status in the future is predicted on the basis of the surrounding status determining unit 132 and the surrounding status predicting unit 134 (Step S102).

In a case in which it is determined that the surrounding status of the subject vehicle M is the predetermined surrounding status, or the predetermined surrounding status in the future is predicted, the inhibition execution control unit 136 determines whether or not the recognition level of the surrounding status is equal to or higher than the second threshold (Step S104). In a case in which it is determined that the recognition level of the surrounding status is determined to be equal to or higher than the second threshold, inquiry information for inquiring whether or not it is allowed to execute inactivation or reduction in functionality of the driving support is output by the HMI control unit 120 to the display unit 44 (Step S106).

Next, the inhibition execution control unit 136 determines whether or not an instruction indicating that the execution is allowed has been received from the display unit 44 (Step S108). In a case in which it is determined that the instruction indicating that the execution is allowed has been received, the inhibition execution control unit 136 causes the switching control unit 110 to execute inactivation or reduction in functionality of the driving support according to the instruction from the vehicle occupant (Step S110). On the other hand, in a case in which it is determined that an instruction indicating that the execution is allowed has not been received in the process of Step S108, the inhibition execution control unit 136 inhibits inactivation or reduction in functionality of the driving support (Step S112). Next, the inhibition execution control unit 136 determines whether the surrounding status of the subject vehicle M is not a predetermined surrounding status, or a further change in the status in the future is not predicted (Step S114). In a case in which the surrounding status of the subject vehicle M is not the predetermined surrounding status, or a further change in the status in the future is not predicted, the inhibition execution control unit 136 releases the inhibition (Step S116) and causes the switching control unit 110 to execute inactivation or reduction in functionality of the driving support according to an instruction from the vehicle occupant.

In a case in which it is determined that the surrounding status of the subject vehicle M is not the predetermined surrounding status in the process of Step S102, and the predetermined surrounding status in the future is not predicted, the inhibition execution control unit 136 causes the switching control unit 110 to execute inactivation or reduction in functionality of the driving support according to the instruction from the vehicle occupant (Step S118). In addition, in a case in which the recognition level of the surrounding status is determined not to be equal to or higher than the second threshold in the process of Step S104, the inhibition execution control unit 136 causes the switching control unit 110 to execute inactivation or reduction in functionality of the driving support according to the instruction from the vehicle occupant (Step S118). In a case in which it is determined that an instruction for execution of inactivation or reduction in functionality of the driving support has not been received in the process of Step S100, the driving support of the second degree is continued. In this way, the process of this flowchart ends. In the process of Step S114, it may be determined whether or not a predetermined time has elapsed after the start of the inhibition of inactivation or reduction in functionality of the driving support, and the inhibition may be released in a case in which the predetermined time has elapsed.

Modified Example

In this embodiment, the inhibition control unit 130 may execute the inhibition control described above in a case in which an instruction for executing inactivation or reduction in functionality of the driving support is received from the driving operator 80 in the middle of the execution of the driving support instead of the driving support changeover switch 42. In such a case, for example, in a case in which an amount of operation that is equal to or greater than a predetermined amount has been received from the brake pedal, the acceleration pedal or the steering wheel in the middle of the execution of the driving support, the inhibition execution control unit 136 determines that an instruction for execution of inactivation or reduction in functionality of the driving support has been received from the driving operator 80.

In a case in which the inhibition execution control unit 136 has received an instruction for inactivation or reduction in functionality of the driving support in accordance with the brake pedal, the inhibition control unit 130 does not inhibit inactivation or reduction in functionality of the driving support even in case in which the surrounding status of the subject vehicle M is a predetermined surrounding status, or a predetermined surrounding status in the future is predicted.

In this way, since an operation of the brake pedal can be prioritized, driving control according to an instruction can be quickly executed in a case in which a vehicle occupant desires to emergently stop or decelerate the subject vehicle.

According to the embodiment described above, a decrease in the degree of driving support at an inappropriate time can be inhibited. According to this embodiment, even in a case in which a switching instruction is received from a vehicle occupant, switching to manual driving is inhibited under a predetermined surrounding status in which a driving risk becomes high when the driving mode is switched to manual driving, a risk according to manual driving can be alleviated.

In the embodiment described above, although inhibition control of driving support based on the surrounding status of the subject vehicle M that is in the current state and a result of the prediction of the surrounding status of the subject vehicle in the near future has been described, inhibition control of driving support may be executed only on the basis of the surrounding status of the subject vehicle M that is in the current state or a result of the prediction of the surrounding status in the future.

[Hardware Configuration]

Figure 8:
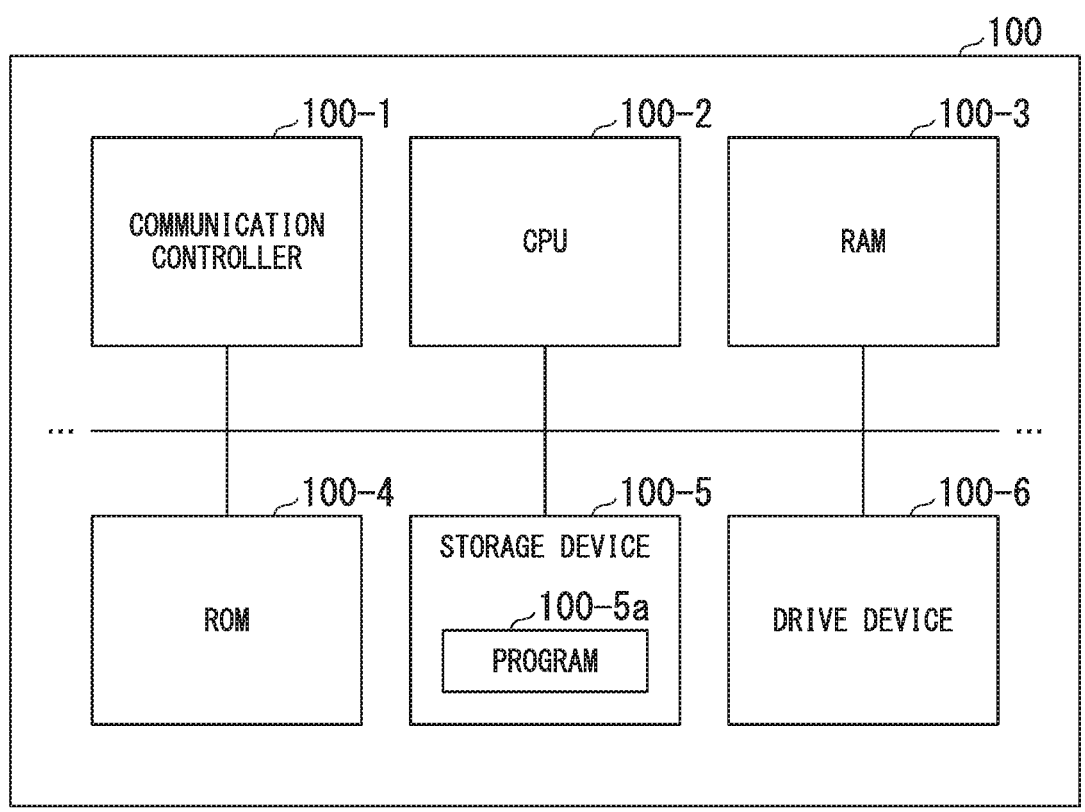
FIG. 8 is a diagram showing one example of the hardware configuration of a master control unit according to an embodiment.

The master control unit 100 according to the embodiment described above, for example, is realized by a hardware configuration as shown in FIG. 8. FIG. 8 is a diagram showing one example of the hardware configuration of the master control unit 100 according to an embodiment.

The master control unit 100 has a configuration in which a communication controller 100-1, a CPU 100-2, a RAM 100-3, a ROM 100-4, a secondary storage device 100-5 such as a flash memory or an HDD, and a drive device 100-6 are interconnected through an internal bus or a dedicated communication line. A portable storage medium (for example, a computer-readable non-transitory storage medium) such as an optical disc is loaded into the drive device 100-6. A program 100-5a stored in the secondary storage device 100-5 is expanded into the RAM 100-3 by a DMA controller (not illustrated in the drawing) or the like and is executed by the CPU 100-2, whereby the functional units of the master control unit 100 are realized. The program referred to by the CPU 100-2 may be stored in the portable storage medium loaded into the drive device 100-6 or may be downloaded from another device through a network NW.

The embodiment described above may be represented as below.

A vehicle control system including a storage device and a hardware processor executing a program stored in the storage device, and the hardware processor, by executing the program, is configured to execute: recognizing a surrounding status of a vehicle; executing driving support for the vehicle by controlling one or both of steering and acceleration/deceleration of the vehicle on the basis of the recognized surrounding status; receiving an instruction relating to the driving support from a vehicle occupant of the vehicle; and inhibiting inactivation or reduction in functionality of the driving support in a case in which a surrounding status of the vehicle is a predetermined surrounding status, or the predetermined surrounding status in the future is predicted in a case in which an instruction for inactivation or reduction in functionality of the driving support is received.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control system comprising:
   a recognition unit recognizing a surrounding status of a vehicle;
   a control unit executing driving support for the vehicle by controlling one or both of steering and acceleration/deceleration of the vehicle on the basis of the surrounding status recognized by the recognition unit;
   a reception unit receiving an instruction relating to the driving support from a vehicle occupant of the vehicle; and
   an inhibition unit inhibiting inactivation or reduction in functionality of the driving support using the control unit in a case in which a surrounding status of the vehicle is a predetermined surrounding status, or it is predicted that the predetermined surrounding status will be reached in the future in a case in which an instruction for inactivation or reduction in functionality of the driving support is received by the reception unit,
   wherein the control unit derives a recognition level of the surrounding status based on the surrounding status recognized by the recognition unit, and enables driving support of a first degree in a case in which the recognition level is equal to or higher than a first threshold and enables driving support of a second degree in which less work than that for the first degree is imposed on a driver in a case in which the recognition level is equal to or higher than a second threshold that is higher than the first threshold, and
   wherein the inhibition unit inhibits inactivation or reduction in functionality of the driving support using the control unit in a case in which an instruction for inactivation or reduction in functionality of the driving support is received by the reception unit in a status in which the recognition level is equal to or higher than the second threshold.

2. The vehicle control system according to claim 1, wherein the inhibition unit predicts that a recognition state acquired by the recognition unit will be degraded in a case in which the vehicle runs in a predetermined running situation and inhibits inactivation or reduction in functionality of the driving support using the control unit in a case in which an instruction for inactivation or reduction in functionality of the driving support is received by the reception unit before the vehicle runs in the predetermined running situation.

3. The vehicle control system according to claim 1, further comprising:
   an output unit outputting information; and
   an output control unit causing the output unit to output an indication indicating whether or not inactivation or reduction in functionality of the driving support will be allowed in a case in which the surrounding status of the vehicle is a predetermined surrounding status or it is predicted that the predetermined surrounding status will be reached in the future in a case in which an instruction for inactivation or reduction in functionality of the driving support has been received by the reception unit.

4. The vehicle control system according to claim 1, wherein the inhibition unit releases the inhibition of inactivation or reduction in functionality of the driving support using the control unit in a case in which the surrounding status recognized by the recognition unit is not the predetermined surrounding status or in a case in which a further change in the status in the future is not predicted after the predetermined surrounding status in a state in which inactivation or reduction in functionality of the driving support using the control unit is inhibited.

5. The vehicle control system according to claim 1, wherein the reception unit includes a brake pedal, and
wherein, in a case in which an instruction for inactivation or reduction in functionality of the driving support is received by the brake pedal, the inhibition unit does not inhibit inactivation or reduction in functionality of the driving support using the control unit even in a case in which the surrounding status of the vehicle is a predetermined surrounding status, or the predetermined surrounding status in the future is predicted.

6. A vehicle control method using a computer, the vehicle control method comprising:
recognizing a surrounding status of a vehicle;
executing driving support for the vehicle by controlling one or both of steering and acceleration/deceleration of the vehicle on the basis of the recognized surrounding status;
receiving an instruction relating to the driving support from a vehicle occupant of the vehicle;
inhibiting inactivation or reduction in functionality of the driving support in a case in which a surrounding status of the vehicle is a predetermined surrounding status, or it is predicted that the predetermined surrounding status will be reached in the future in a case in which an instruction for inactivation or reduction in functionality of the driving support is received;
deriving a recognition level of the surrounding status based on the surrounding status;
enabling driving support of a first degree in a case in which the recognition level is equal to or higher than a first threshold and enabling driving support of a second degree in which less work than that for the first degree is imposed on a driver in a case in which the recognition level is equal to or higher than a second threshold that is higher than the first threshold; and
inhibiting inactivation or reduction in functionality of the driving support in a case in which an instruction for inactivation or reduction in functionality of the driving support is received in a status in which the recognition level is equal to or higher than the second threshold.

7. A computer-readable non-transitory storage medium having a program stored thereon, the program causing a computer to execute:
recognizing a surrounding status of a vehicle;
executing driving support for the vehicle by controlling one or both of steering and acceleration/deceleration of the vehicle on the basis of the recognized surrounding status;
receiving an instruction relating to the driving support from a vehicle occupant of the vehicle;
inhibiting inactivation or reduction in functionality of the driving support in a case in which a surrounding status of the vehicle is a predetermined surrounding status, or it is predicted that the predetermined surrounding status will be reached in the future in a case in which an instruction for inactivation or reduction in functionality of the driving support is received;
deriving a recognition level of the surrounding status based on the surrounding status;
enabling driving support of a first degree in a case in which the recognition level is equal to or higher than a first threshold and enabling driving support of a second degree in which less work than that for the first degree is imposed on a driver in a case in which the recognition level is equal to or higher than a second threshold that is higher than the first threshold; and
inhibiting inactivation or reduction in functionality of the driving support in a case in which an instruction for inactivation or reduction in functionality of the driving support is received in a status in which the recognition level is equal to or higher than the second threshold.

* * * * *